E. M. BUTLER.
DETACHABLE HORSESHOE CALK.
APPLICATION FILED MAY 8, 1919.
1,318,841.
Patented Oct. 14, 1919.
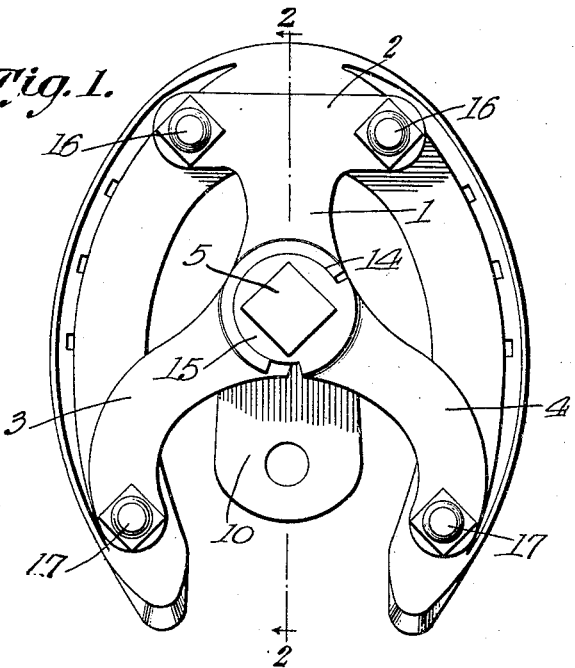
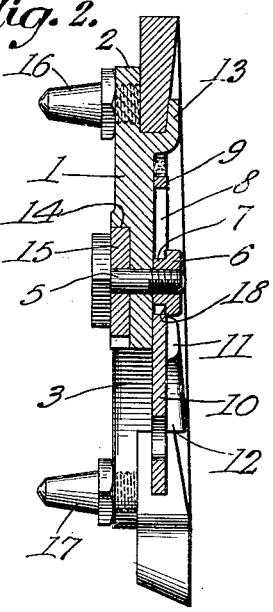
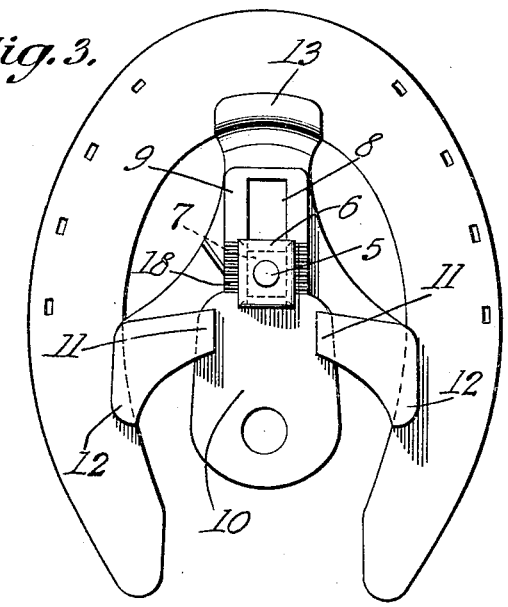
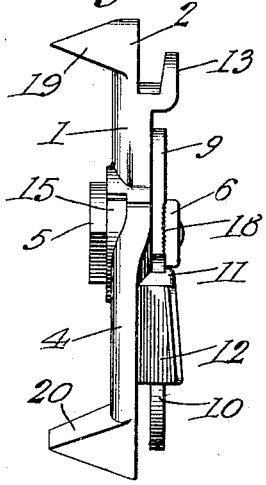
Inventor
Edward M. Butler
By Lester L. Sargent
Attorney

UNITED STATES PATENT OFFICE.

EDWARD M. BUTLER, OF CROTON FALLS, NEW YORK, ASSIGNOR OF ONE-THIRD TO LESTER L. SARGENT, OF WASHINGTON, DISTRICT OF COLUMBIA.

DETACHABLE HOSESHOE-CALK.

1,318,841.     Specification of Letters Patent.     Patented Oct. 14, 1919.

Application filed May 8, 1919. Serial No. 295,666.

*To all whom it may concern:*

Be it known that I, EDWARD M. BUTLER, a citizen of the United States, residing at Croton Falls, in the county of Westchester and State of New York, have invented a new and useful Detachable Horseshoe-Calk, of which the following is a specification.

The object of my invention is to provide an improved horseshoe calk of the detachable type which can be readily attached and which is so constructed as to remain firmly on the shoe until intentionally removed. It is further my object to provide a device of this nature on which screw calks can be used, thus making it possible to merely replace the calks when worn without requiring a renewal of the entire device. It is an especial object of my invention to provide detachable horseshoe calks which have few parts and which are adapted to fit any ordinary plain horseshoe, in order that the device may be manufactured at small cost and be widely serviceable. I attain these and other objects of my invention by the mechanism illustrated in the accompanying drawings, in which:—

Figure 1 is a bottom plan of my invention applied to a horseshoe;

Fig. 2 is a section on line 2—2 of Fig. 1;

Fig. 3 is a top plan of my invention applied to a horseshoe; and

Fig. 4 is a side elevation of a modified form of the invention.

Like numerals designate like parts throughout the several views.

Referring to the accompanying drawings, I provide a plate 1 having a front extension 2, which with the lip 13 engages the inner forward portion of the horseshoe; the plate 1 also having rear arms 3 and 4, which with the corresponding lips 12 engage the inner rear portions of the horseshoe. As will be observed by referring to Fig. 1, the arm 4 is provided with a round end portion 15 having a limited rotatable movement in the socket 14 of plate 1, as shown in Figs. 1 and 2. I provide a suitable bolt 5 extending through the end 15 of the adjustable arm 4 and the corresponding portion of plate 1, this bolt being secured in place by a nut 6, which member has a small portion 7 adapted to seat in the slot 8 of the wedge 10. The wedge 10 is inserted under lips 11 of the arms 3 and 4, as illustrated in Figs. 2 and 3. The wedge 10 is provided with an extension 9 having a slot 8 into which the reduced portion 7 of the nut 6 projects, as illustrated in Figs. 2 and 3. The wedge 10 is provided with a roughened portion 18 adapted to lock the nut 6 against working loose. I provide suitable screw calks 16 in extension 2 of plate 1, as shown in Fig. 1; and similar screw calks 17 mounted on arms 3 and 4, as illustrated in Figs. 1 and 2. Calks 16 and 17 are provided with hardened central portions to increase their efficiency.

Referring to Fig. 4 of the drawings, a modified form of the invention is shown having integrally formed calks 19 and 20.

What I claim is:—

1. In a device of the class described, the combination of a plate having an extension lipped portion engaging the inner front portion of the horseshoe, arms having lipped portions engaging the rear part of the horseshoe, one of said arms being adjustably mounted on the plate, lips on the rear arms shaped to receive a wedge member, a wedge having a slot in its end portion and having a roughened portion, a bolt extending through the adjustable arm and the main plate, and a nut engaging said bolt and shaped to seat in the slot in the above described wedge and to engage its roughened portion.

2. In a device of the class described, the combination of a plate having an extension lipped portion engaging the inner front portion of the horseshoe, rear arms having lipped portions engaging the rear part of the horseshoe, one of said arms being adjustably mounted on the plate, lips on the arms shaped to receive a wedge member, a wedge having a slot in its end portion, a bolt extending through the adjustable arm and the main plate, fastening means engaging said bolt and securing the members in fixed adjusted engagement on the horseshoe, and screw calks mounted at appropriate forward and rear portions of the plate extension and arms respectively, substantially as set forth.

3. In a device of the class described, the combination of a plate having portions thereof shaped to engage the horseshoe, one of said portions being swingable to admit of adjustment, a wedge member, lips formed to receive the wedge member, the wedge member having a slot, and means for securing the various members in locked engagement on a horseshoe, and calks attached to the device, substantially as shown.

4. In a device of the class described, the combination of a plate having an extension lipped portion engaging about the inner front portion of the horseshoe, arms having lipped portions engaging opposite sides of the rear part of the horseshoe, one of said last arms being adjustably mounted on the plate, a wedge having a slot in its end portion and having a roughened portion, a bolt extending vertically through the adjustable arm and the main plate, and a nut engaging said bolt and shaped to seat in the slot in the above-described wedge and to engage its roughened portion.

EDWARD M. BUTLER.

Copies of this patent may be obtained for five cents each, by addressing the "Commissioner of Patents, Washington, D. C."